United States Patent
Endel et al.

(10) Patent No.: US 12,449,151 B2
(45) Date of Patent: Oct. 21, 2025

(54) BUILDING SUPERVISORY CONTROL SYSTEM HAVING SAFETY FEATURES

(71) Applicant: Honeywell International Inc., Charlotte, NC (US)

(72) Inventors: Petr Endel, Prague (CZ); Karel Marik, Revnice (CZ); Kapil Sharma, Midlothian, VA (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 379 days.

(21) Appl. No.: 17/230,883

(22) Filed: Apr. 14, 2021

(65) Prior Publication Data

US 2021/0325070 A1   Oct. 21, 2021

Related U.S. Application Data (60) Provisional application No. 63/010,527, filed on Apr. 15, 2020.

(51) Int. Cl.
| | |
|---|---|
| *F24F 11/49* | (2018.01) |
| *F24F 11/46* | (2018.01) |
| *F24F 11/65* | (2018.01) |
| *F24F 120/10* | (2018.01) |
| *F24F 140/60* | (2018.01) |

(52) U.S. Cl.
CPC .............. *F24F 11/49* (2018.01); *F24F 11/46* (2018.01); *F24F 11/65* (2018.01); *F24F 2120/10* (2018.01); *F24F 2140/60* (2018.01)

(58) Field of Classification Search
None
See application file for complete search history.

(56) References Cited

U.S. PATENT DOCUMENTS

| | | | |
|---|---|---|---|
| 6,041,178 A | 3/2000 | Rybarczyk et al. | |
| 9,273,878 B2 | 3/2016 | Kucera | |
| 10,031,494 B2 | 7/2018 | Holaso | |
| 10,409,243 B2 | 9/2019 | Holaso | |
| 11,333,562 B1* | 5/2022 | Johnson | G01K 13/20 |
| 2007/0043478 A1* | 2/2007 | Ehlers | F24F 11/58 |
| | | | 700/276 |
| 2009/0171512 A1* | 7/2009 | Duncan | F24F 11/30 |
| | | | 62/157 |
| 2010/0006660 A1* | 1/2010 | Leen | F24F 11/38 |
| | | | 236/51 |

(Continued)

OTHER PUBLICATIONS

U.S. Appl. No. 16/747,479, "Smart Building Score System", filed Jan. 20, 2020.

(Continued)

*Primary Examiner* — Kamini S Shah
*Assistant Examiner* — Istiaque Ahmed
(74) *Attorney, Agent, or Firm* — Seager, Tufte & Wickhem, LLP (57) ABSTRACT

A building supervisory control structure having a supervisor connectable to a cloud and a heating, ventilation and air conditioning (HVAC) unit connected to the supervisor and the cloud. A safety features stack is connected to the supervisor. The safety features stack includes a connectivity check automated fail-over, an optimization watchdog, a rule-based comfort protection mechanism, savings bottlenecks overview, a human override, and a notification mechanism.

15 Claims, 8 Drawing Sheets

(56) References Cited

U.S. PATENT DOCUMENTS

| | | | |
|---|---|---|---|
| 2012/0125592 A1* | 5/2012 | Fadell | B01D 46/0086 96/417 |
| 2013/0211783 A1* | 8/2013 | Fisher | G05D 23/1904 702/182 |
| 2014/0316583 A1* | 10/2014 | Ambriz | F24F 11/30 700/277 |
| 2015/0094825 A1* | 4/2015 | Kinoshita | H04L 12/2825 700/19 |
| 2015/0167995 A1* | 6/2015 | Fadell | F24F 11/59 700/275 |
| 2016/0201934 A1* | 7/2016 | Hester | F24F 11/89 700/276 |
| 2016/0209896 A1 | 7/2016 | Yokomizo et al. | |
| 2016/0223997 A1* | 8/2016 | Minezawa | G05B 15/02 |
| 2016/0370814 A1* | 12/2016 | Hanley | G05B 15/02 |
| 2017/0336770 A1* | 11/2017 | Macmillan | G05B 19/042 |
| 2017/0364052 A1 | 12/2017 | Matsuda et al. | |
| 2018/0266718 A1* | 9/2018 | Gillette | F24F 11/64 |
| 2018/0293038 A1* | 10/2018 | Meruva | G06F 3/14 |
| 2021/0141346 A1* | 5/2021 | Wenzel | G05B 13/041 |

OTHER PUBLICATIONS

Invite to Pay Additional Fees dated Jul. 5, 2021 for International Application No. PCT/US2021/027481.

* cited by examiner

BUILDING SUPERVISORY CONTROL SYSTEM HAVING SAFETY FEATURES

This Application claims the benefit of U.S. patent application Ser. No. 63/010,527, filed Apr. 15, 2020. U.S. patent application Ser. No. 63/010,527, filed Apr. 15, 2020, is hereby incorporated by reference.

BACKGROUND

The disclosure pertains to building control systems having a basis in safety.

SUMMARY

The disclosure reveals a building supervisory control structure which has a supervisor connectable to a cloud and a heating, ventilation and air conditioning units connected to the supervisor. A safety features stack is connected to the supervisor. The safety features stack includes a connectivity check automated fail-over, an optimization watchdog, a rule-based comfort protection mechanism, savings bottlenecks overview, a human override, and a notification mechanism. The connectivity check automated fail-over eliminates issues with a potential loss of cloud-building connectivity. The optimization watchdog eliminates a potential loss of comfort in case a machine model is suboptimal or incorrect. The rule-based comfort protection mechanism resolves automatically any unexpected on-site situation which has a potential to cause or increase discomfort. The savings bottlenecks overview enables detection and mitigation of savings constraints and bottlenecks. A human override enables a control to revert back to original strategy when desired by a customer, service engineer or CBSCS operator. The notification mechanism keeps all parties informed so that they can act appropriately in a timely fashion.

DESCRIPTION

The present system and approach incorporate one or more processors, computers, controllers, user interfaces, wireless and/or wire connections, and/or the like, in an implementation described and/or shown herein.

This description provides one or more illustrative and specific examples or ways of implementing the present system and approach. There are numerous other examples or ways of implementing the system and approach.

Aspects of the system or approach are be described in terms of symbols in the drawing. Symbols have virtually any shape (e.g., a block) and can designate hardware, objects, components, activities, states, steps, procedures, and other items. The names or terms of components or features are not necessarily strictly consistent in spelling as long as they describe the components or features sufficiently for identification of them herein.

An issue addressed here is related to an autonomous heating, ventilation and air conditioning (HVAC) control. In particular, safety features of a cloud-based supervisory control system (CBSCS) are addressed for a building HVAC system.

The disclosure solves frequent customer concerns about reliability and safety of CBSCS, especially in case where the CBSCS is based on machine learning and a customer has strict requirements for comfort in the building, while discomfort can have serious consequences such as occupants' complaints, loss of occupants' productivity, occupants' illness, or damage of HVAC or non-HVAC equipment.

The safety features stack description has a safety features stack for building supervisory control—connectivity check automatic fail-over, rule-based comfort protection mechanism, optimization watchdog, savings bottlenecks overview, notification mechanism, and human override. The safety features stack is implemented at specific intersections of solution subsystems (e.g., core pipeline, comfort setting and protection, human interaction) and implementation scope (e.g., building, cloud, user interface).

Figure 1A:
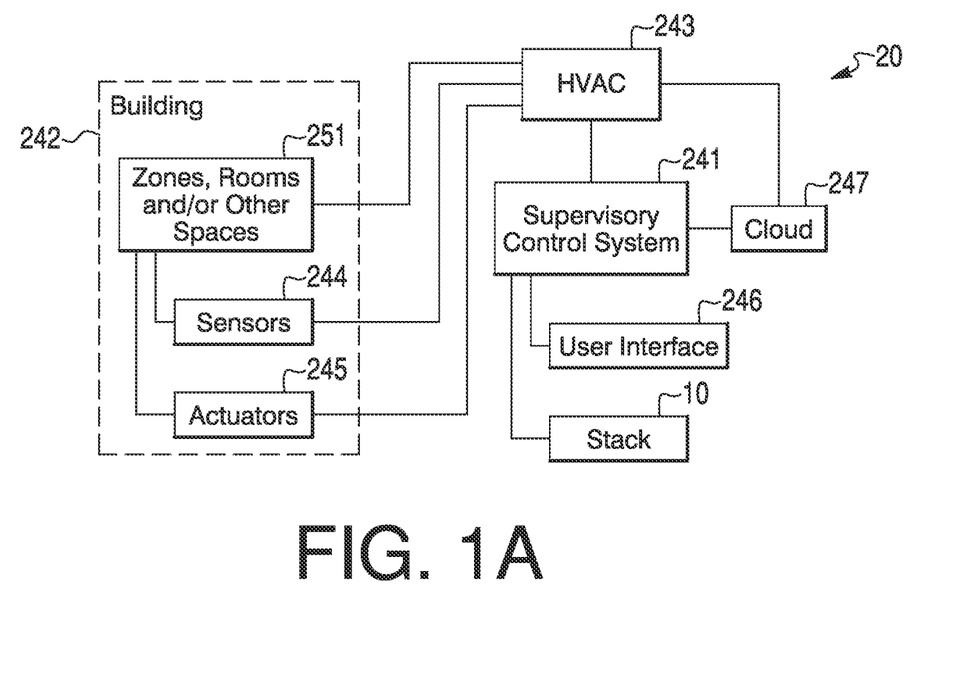
FIG. 1A is a diagram of building supervisory control system having a safety features stack.

FIG. 1A is a diagram of a building supervisory control system 20 having a safety features stack 10. The diagram of system 20 shows one of several configurations. Stack 10 is be connected to a building supervisory control system 241. An HVAC 243 is connected to supervisory control system 241 and to sensors 244 and actuators 245. Some sensors 244 and actuators 245 are located, at least in some zones, rooms, other spaces or places 251 in building 242. HVAC 243 is situated in or outside of building 242. A user interface 246 is connected to building supervisory control system 241. Components of system 20 are combined in various ways, in that one or more components are combined within other components, or be situated separately or standing-alone apart from other components. Building supervisory control system 241 and HVAC 243 are connected to a cloud 247 and/or other outside items by wire or wireless conveyances.

Figure 1B:
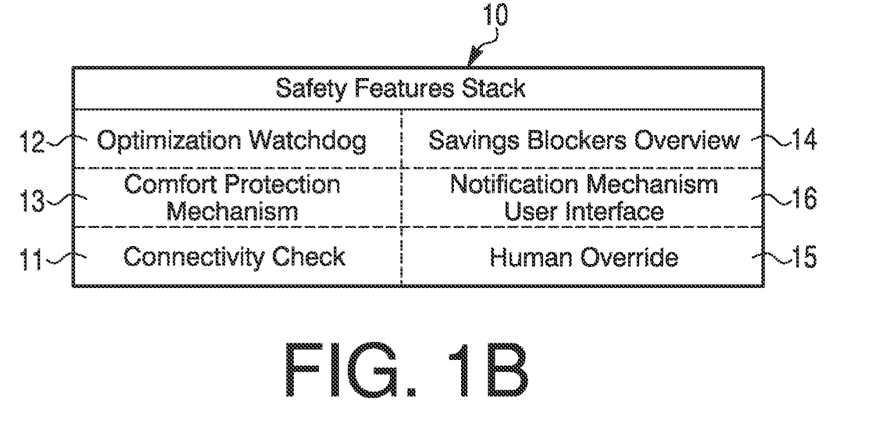
FIG. 1B is a diagram of the safety features stack in two portions.

Stack 10 in a diagram of FIG. 1B has features of optimization watchdog 12, comfort protection mechanism 13, savings bottlenecks overview 14 and notification mechanism user interfaces 16. Stack 10 further has features of connectivity check 11 and human override 15. One uses terms "Cloud Human Override" (this is done by a CBSCS operator) and "On-Site Human Override" (done by a customer or site service engineer).

The connectivity check and automatic fail-over 11 notes that if a CBSCS vs. on-site setpoint differs, then there may be a warning and a switch back to the original strategy within, e.g., 5 minutes. The optimization watchdog 12 involves constraints that express adjustable comfort settings for each zone/room. The optimization watchdog ensures that optimized setpoints have adjustable bounds and maximum allowed steps (that prevents sudden changes of action variables). If there appears no feasible solution for one or more times in a row, then there is a switch back to the original strategy. The rule-based comfort protection mechanism 13 provides 24-hour/7-day comfort monitoring. In case the model is wrong and a certain comfort constraint is exceeded, then a rule-based control is invoked automatically (with adjustable setpoint steps). The savings bottlenecks overview 14 identifies and checks rogue zones that prevent savings, enable/disable them for comfort monitoring, and suggest parameters for constraints (targets of maximum zone temperature, cooling demand, and so on). The human override 15 provides, at any moment, a manual switch back to the original strategy. The notification mechanism 16 informs an operator about any significant change of the system that affects the optimization.

Figure 2:
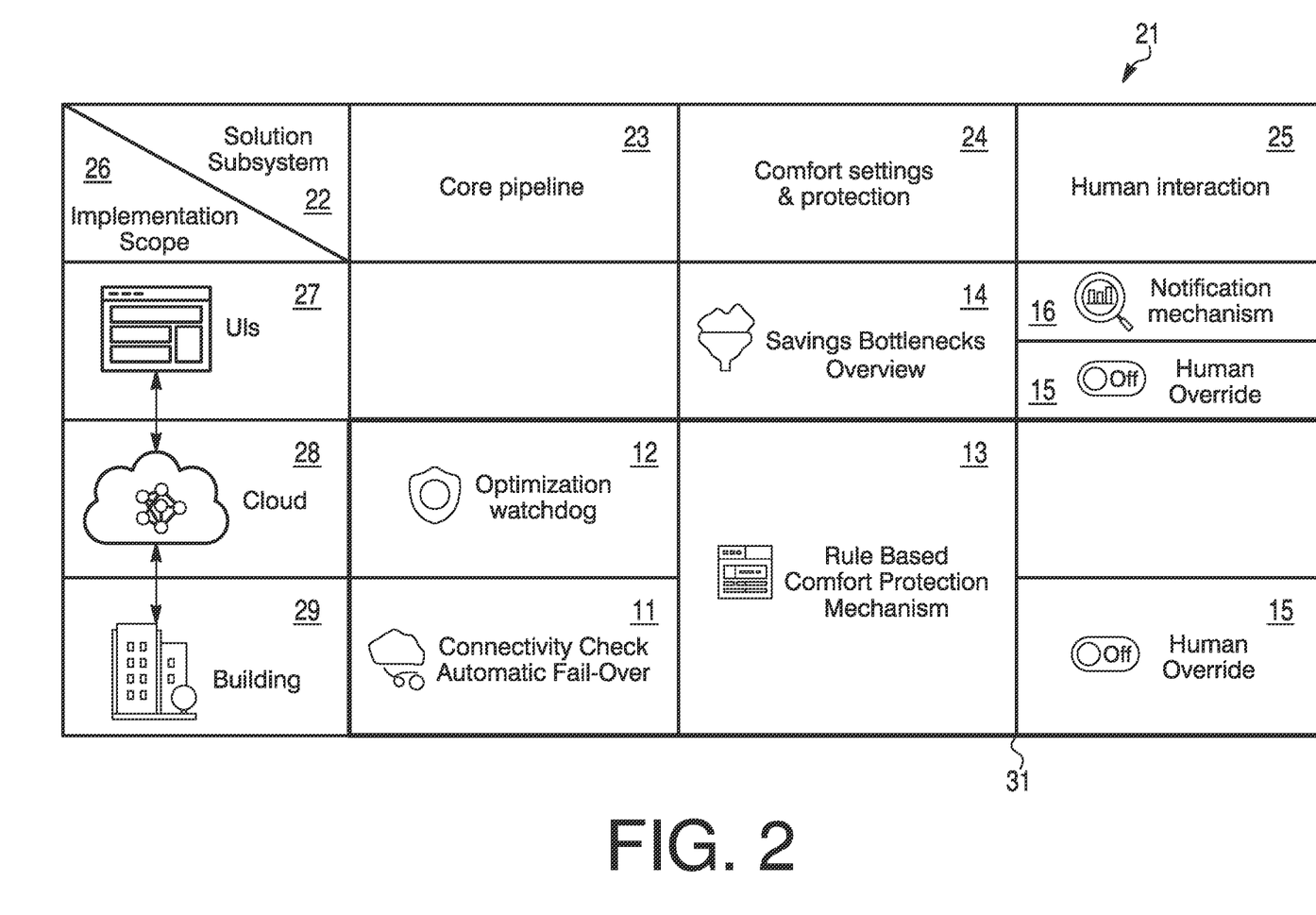
FIG. 2 is a diagram of a grid or layout of the safety features for a stack includes an optimization watchdog, a connectivity check automatic fail-over, comfort protection mechanism, savings bottlenecks overview, a human override and notification mechanism.

In sum, the individual safety features in FIG. 2 incorporate: 1) Connectivity check automated fail-over 11 as part of core pipeline subsystem 23 implemented at a building scope 29; 2) Optimization watchdog 12 as part of core pipeline subsystem 23 implemented at a cloud scope 28; 3) Rule-based comfort protection mechanism 13 as part of a comfort setting and protection subsystem 24 implemented both at the building scope 29 and cloud scope 28; 4) Savings bottlenecks overview 14 as part of the comfort setting and protection subsystem 24 implemented at user interface scope 27; 5) Human override 15 as part of a human interaction subsystem 25 implemented both at building scope 29 and user interface scope 27; and 6) Notification mechanism 16 as part of a human interaction subsystem 25 implemented at user interface scope 27. These features are numbered 11-16 in lieu of numbers 1)-6), respectively.

Diagram 21 shows a grid or layout of the safety features for a stack 10. Solution subsystems 22 incorporate a core pipeline 23, comfort settings and protections 24, and human interaction 25. These solution subsystems are listed horizontally, or in another orientation. An implementation scope 26 incorporates user interfaces 27, a cloud 28 and a building 29. These implementation scopes are listed vertically, or in another orientation.

Each safety feature is situated or located according to a solution subsystem and an implementation scope. A connectivity check and automatic fail-over 11 are of core pipeline 23 and building 29. An optimization watchdog 12 is of core pipeline 23 and cloud 28. A rule-based comfort protection mechanism 13 is of comfort settings and protection 24, and cloud 28 and building 29. Savings bottlenecks overview 14 are of comfort settings and protection 24, and user interfaces 27. A first human override 15 is of human interaction 25 and user interfaces 27. A second human override 15 is of human interaction 25 and a building 29. There are a "Cloud Human Override" (this is done by a CBSCS operator) and an "On-Site Human Override" (done by a customer or site service engineer).

One may note what technical benefits may be generated. The disclosure eliminates or significantly reduces practical issues of a cloud-based supervisory controller or supervisor for buildings. In particular: a) It eliminates issues with a potential loss of cloud-building connectivity (Connectivity check automatic fail-over (11)); in addition, or alternatively, b) It eliminates a potential loss of comfort in case the machine learning model is suboptimal or wrong (Optimization watchdog (12)); in addition, or alternatively, c) It resolves automatically any unexpected on-site situation which has a potential to cause serious discomfort (Rule based comfort protection mechanism (13)); and in addition, or alternatively, d) It enables full customer control to revert back to original strategy when desired (Human override (15)).

A business advantage/technical differentiator that the disclosure provides (e.g., cost, performance) includes a complex safety mechanism and solution enabler. In addition, or alternatively, it improves both comfort performance (e.g., by a rule-based comfort protection mechanism (13), connectivity check automatic fail-over (11) and optimization watchdog (12)) and energy performance (e.g., by savings bottlenecks overview (14)) of any supervisory control. The disclosure enables and improves a connectivity (11) enterprise offering in a supervisory closed loop control. Notification user interfaces 16 of a safety features stack for building supervisory control is also included.

The disclosure generates one or more of the following technical benefits. The disclosure eliminates or significantly reduces practical issues of a cloud based supervisory controller for buildings. In particular: a) It enables detection and mitigation of savings constraints and bottlenecks (savings bottlenecks overview (14)); b) It enables full customer control to revert back to original strategy when desired (human override (15)); and c) It keeps virtually all parties (e.g., a site engineer, solution engineer, owner, potential occupants, and so on) informed so that they can act appropriately in a timely fashion (i.e., a notification mechanism (16)). The details of individual safety measures are be found in the description and Figures associated herein.

There is a software component that has a stack level of a cloud with a secure, scalable infrastructure for collecting, aggregating and storing data, allowing connected "things" to communicate, an offering/SaaS solution available, IaaS/PaaS, and data lakes. A software type has connected/connectivity with an offering available through a cloud or a direct, remote connection (SaaS) or that covers infrastructure enabling connected services. The present approach generates or captures data. There are HVAC operation related data, which reside on a cloud.

U.S. Pat. No. 10,101,048, issued Oct. 16, 2018, is hereby incorporated by reference. It concerns a supervisory controller for HVAC systems.

Figure 3:
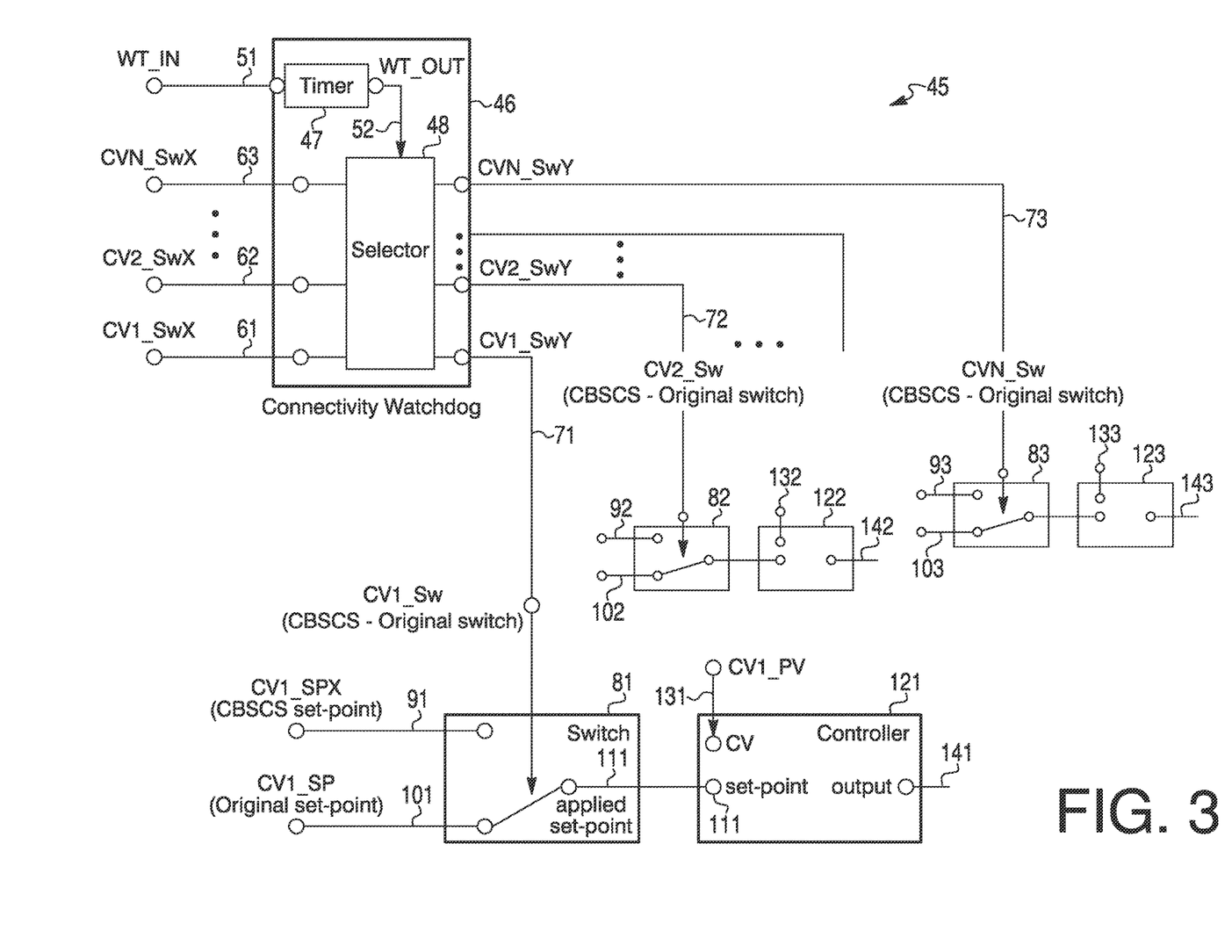
FIG. 3 is a diagram of an example connectivity check automatic fail-over.

FIG. 3 is a diagram 45 of a connectivity check automatic fail-over 11 is noted as in the following. A connectivity watchdog 46 contains two components: a timer 47 and a selector 48. The timer is used for regular checks of connectivity, while the selector updates the exercise management standing operating procedures (supervisory controller or CBSCS), i.e., the original control strategy switches are based on the connectivity checks. A description of the connectivity watchdog logic follows, supported by a diagram in FIG. 3.

CBSCS writes a "1" value to the Timer's input (WT_IN) in regular interval (e.g., every 5 minutes). This resets the Timer and its output (WT_OUT) 52 remains "1" for next control interval (e.g., 15 min).

I) If BMS does not get "1" value from CBSCS during the next control interval, the Timer expires and its output (WT_OUT) will become "0".

II) The Timer's output (WT_OUT) controls the Selector's output like a switch:
   a) If "WT_OUT=1", the Selector's outputs (CV1_SwY, . . . , CVN_SwY) are the same as the inputs (CV1_SwX, . . . , CVN_SwX), which were written by CBSCS.
   b) If "WT_OUT=0", the Selector's outputs (CV1_SwY, . . . , CVN_SwY) are all "0".

III) The Selector's outputs CV1_SwY, . . . , CVN_SwY are used as inputs to the strategy (set-point) switches between CBSCS and the original control strategy.

A WT_IN input terminal 51 may go to timer 47. A WT_OUT output terminal 52 goes to selector 48. A CV1_SwX input terminal 61 goes to selector 48. A CV2_SwX input terminal 62 goes to selector 48. There is an N number of input terminals to selector 48 as indicated by CVN_SwX input terminal 63. Corresponding to each input terminal of terminals 61, 62, . . . , and 63, is an output terminal from a group of N number output terminals 71, 72, . . . , and 73, as indicated by CV1_SwY, CV2_SwY, . . . , and CVN_SwY, respectively. Each output of the group of outputs 71, 72, . . . , and 73, goes as an input CV1_Sw (CBSCS-Original Switch), CV2_Sw (CBSCS-Original switch), . . . , CVN_Sw (CBSCS-Original switch), respectively, and to a switch 81, 82, . . . , and 83, respectively. Also, to each switch 81, 82, . . . , and 83, has a pair of inputs CV1_SPX (CBSCS set-point) and CV1-SP (Original set-point), CV2_SPX (CBSCS set-point) and CV2-SP (Original set-point), . . . , and CVN-SPX (CBSCS set-point) and CVN-SP (Original set-point), respectively, as inputs 91 and 101, 92 and 102, . . . , and 93 and 103, respectively, as indicated by inputs 71, 72, . . . , and 73. Set-points 111, 112, . . . , and 113 are sent from switches 81, 82 . . . , and 83 to controllers 121, 122, . . . , and 123, respectively. Each controller of controllers 121, 122, . . . , and 123 have respective inputs 131 (CV1_PV, 132 (CV2_PV, . . . , and 133 (CVN_PV). Controllers 121, 122, . . . , and 123, respectively, have outputs 141, 142, . . . , and 143; each controller has one output corresponding to it. Although, the design of diagram 45 results with corresponding components of one unit or instead is more than one or none.

Figure 4:
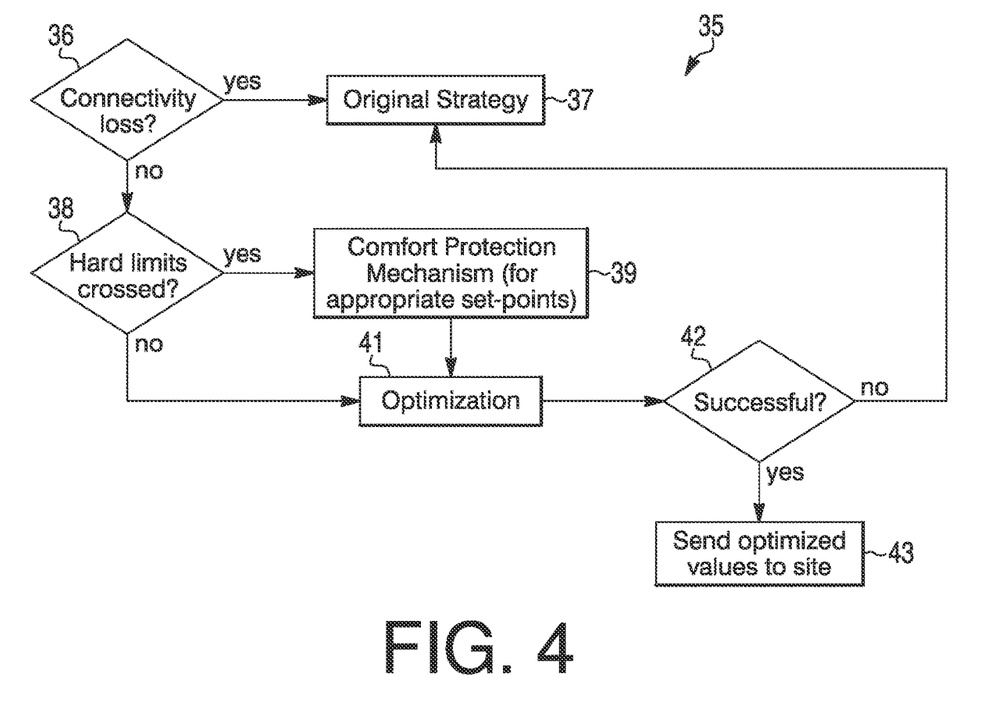
FIG. 4 is a diagram showing a summary of an optimization process.

FIG. 4 is a diagram 35 showing a summary of an optimization process. At symbol 36, there may be a decision point of whether there was a connectivity loss or not. If an answer is yes then an original strategy 37 is applied. If the answer is no, then a decision point at symbol 38 of whether there are hard limits crossed is asked. If an answer is yes, then a comfort protection mechanism 39 is applied for appropriate set points. If the answer is no, then an optimization at a symbol 41 is also be applied after comfort protection mechanism 39. Upon an optimization 41, at a symbol, a decision point whether optimization 41 was successful is asked. If an answer is yes, then optimized values are sent to a site at symbol 43. If the answer is no, then a return to original strategy 37 is effected.

Figure 5:
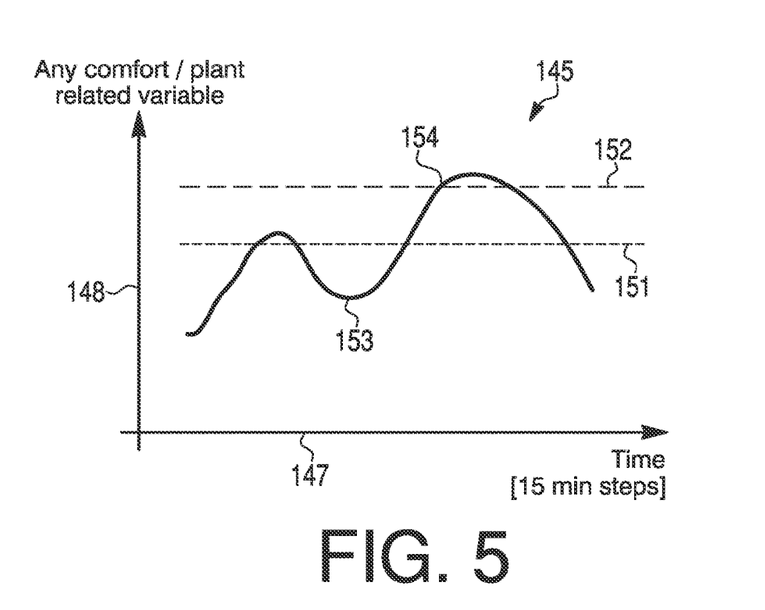
FIG. 5 is a diagram of an example comfort protection mechanism main principle in form of a graph.

FIG. 5 is a diagram 145 of an example comfort protection mechanism main principle in form of a graph having an axis 147 for time which could be in terms of 15-minute steps. Alternatively, the steps are of other amounts. The graph represents a magnitude of any comfort, plant related variable 153, with an axis 148. A line 151 represents a soft limit defined as an upper constant for an optimizer. The optimizer should not recommend operation exceeding the soft limit. A line 152 represents a hard limit that should not be exceeded. When exceeding the hard limit, a comfort protection mechanism is to be triggered. The comfort protection mechanism should be automatically triggered at a point 154. Set points adjustments are defined by rules to mitigate various situations such as resulting from the magnitude of any comfort, plant related variable 153 exceeding the soft limit line 151 or the hard limit line 152.

A comfort protection mechanism implementation is noted. Rules are setup automatically. In a building context, if comfort is violated in a Zone ABC, then only equipment upstream of Zone ABC needs to change the operation.

Setpoints need to be changed. Background knowledge about elementary behavior of an HVAC system is incorporated into "expected gains". For a given pair of setpoints, variables or the like, the relationship should be none, positive or negative (e.g., if chilled a water temperature setpoint is decreased, the downstream cooling demand should go down). One may note In what direction the setpoints need to be changed to mitigate the undesired situation. There is an adjustable parameter to derive a step size (based on proportion of setpoint allowed range). One can indicate how much the setpoints need to be changed.

Figure 6:
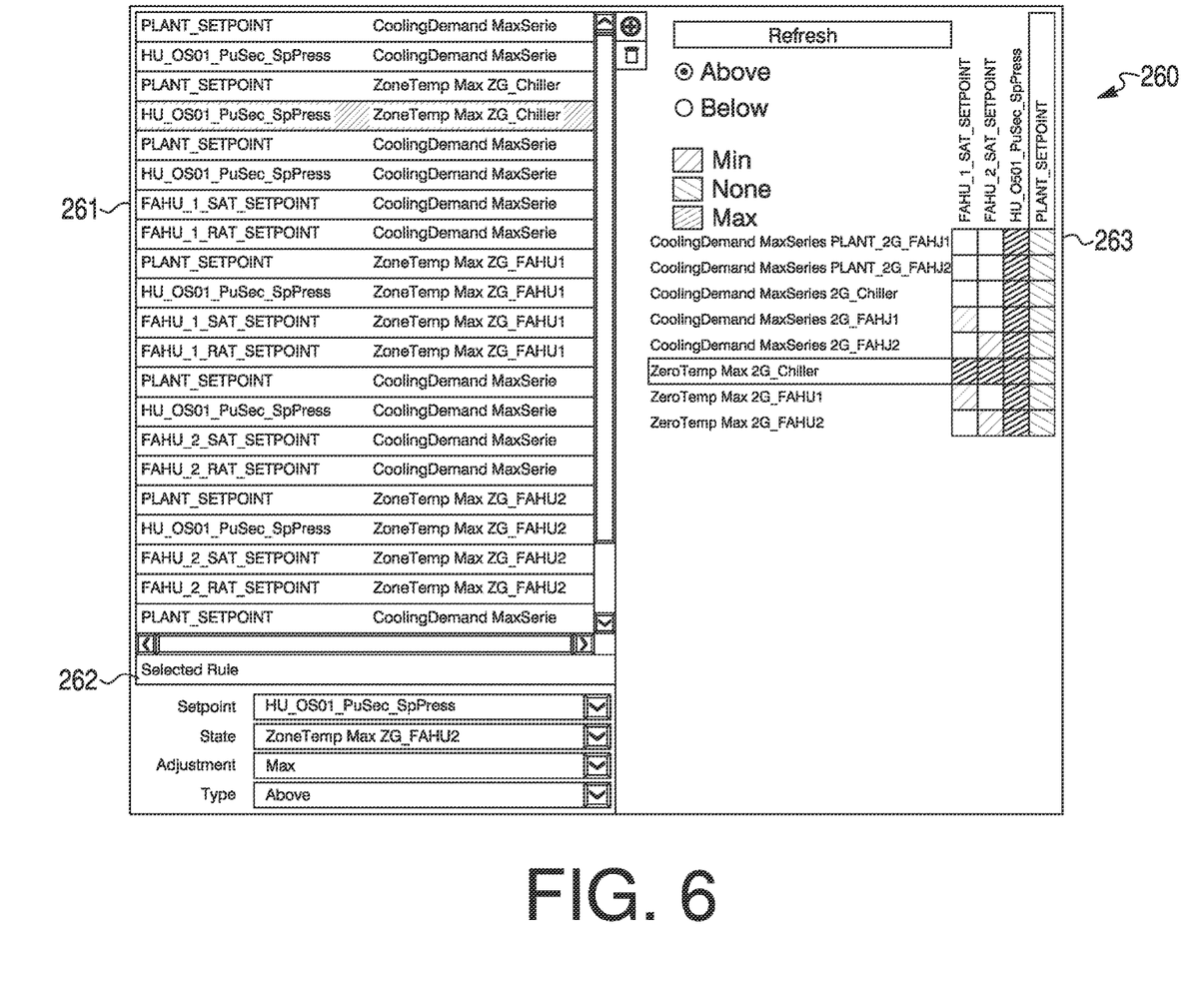
FIG. 6 is a diagram of a comfort protection mechanism user interface of a heating, ventilation and air conditioning unit for a building.

FIG. 6 is a diagram 260 having three parts 261, 262 and 263. Part 261 has a top left list of pairs "setpoint & comfort, plant related (state) variable" Part 262 has a bottom left with parameters of a rule for the selected pair. Max, meaning Decrease, Do nothing, and/or Increase. A type can be Above, Below—whether the rule is triggered when a state variable is above or below the limit.

Part 263 has a right table summarizing rules: Above & Below—which type to be displayed; Min, None, Max in the table—what setpoint adjustment should be done when given State variable is above/under the limit. For example, when ZoneTemp Max ZG_Chiller (i.e., maximum temperature of a zone group named "ZG_Chiller", zone group means zones that are served by same upstream equipment) is above its limit, the HU_OS01_PuSec_SpPress (i.e., pump water pressure setpoint) should be increased, and PLANT_SETPOINT (i.e., chilled water temperature setpoint) should be decreased.)

Optimization watchdog 12 is subject to constraints such as comfort and setpoints. As to comfort, there are adjustable comfort settings for each zone and/or room. The set points have adjustable bounds and have maximum allowed steps so as to prevent sudden changes of action variables. If optimization fails (e.g., where there is no feasible solution, or the optimization did not converge to a solution within a reasonable amount of time or number of iterations) for N times in a row, then an automated switch back to original strategy occurs.

Figure 7:
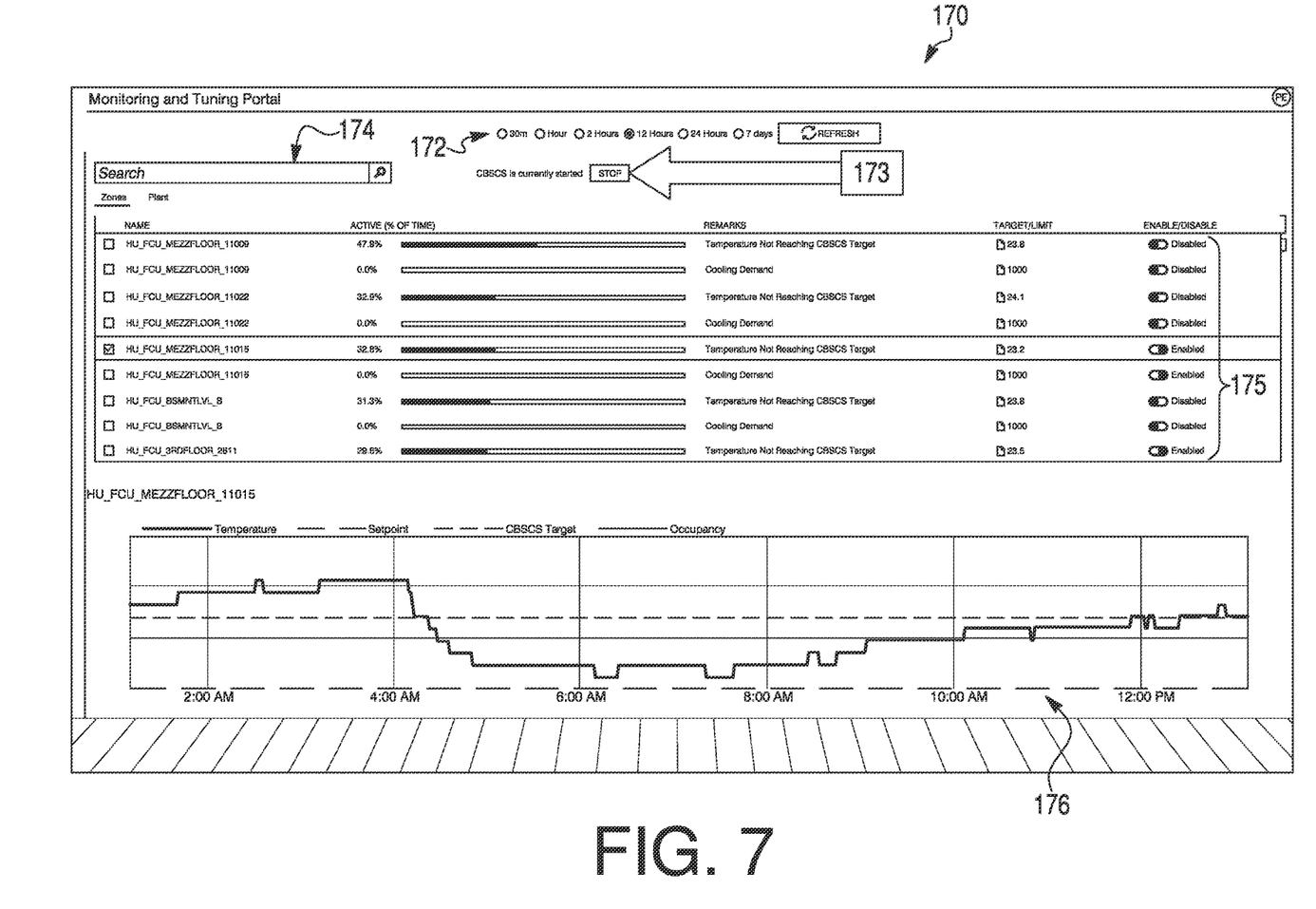
FIG. 7 is a diagram of a chart having information relating to savings bottlenecks user interfaces.

FIG. 7 is a diagram 170 of a chart having information relating to savings bottlenecks user interfaces, which are regarded as a monitoring and tuning tool. Diagram 170 has a selection of history 172 for the past number of hours, days, and so forth, to be analyzed, and a search place 174, for searching zones or a plant at an upper portion 175. At an upper portion 175 of the diagram 170 are shown various zones, or it could show various plants, according to a name. On a row to the right for each listed name is an indication of an active status for a certain percentage of time. On the same row, there are remarks pertaining to the name listed in the row. Examples of remarks are "Temperature not Reaching CBSCS target" or "Cooling Demand". Further to the right in the respective row may list a Target/Limit, such as "24.1" or "1000" as an example. Further yet to the right is an indication of whether the system for the selected zone or plant is enabled or disabled.

For the selected zone of "HU_FCU_MEZ-ZFLOOR_11015" are certain parameters such as Temperature, Setpoint, CBSCS Target, and Occupancy. These parameters are lines plotted in a graph of a lower portion 176 of diagram 170, as degrees of temperature versus the time of day or night. The lines may be dots, dashes, and dot and dash for temperature, set point, and CBSCS target, respectively. Occupancy is depicted by shady background of the plot. Clicking on "STOP" 173 engages an override. The "STOP" 173 button here is one the human overrides, in particular block 15 in the FIG. 2, on the level of UI 27.

Savings bottlenecks overview 14 are noted. CBSCS has constraints that limit a minimization of energy. The constraints are related to zones comfort of demand or temperature that can trigger a comfort protection mechanism. The constraints are also related to plants that can have setpoint limits and maximum allowed steps. If the constraints are active, then they are savings blockers. A use case of a monitoring and tuning tool detects and mitigates savings blockers, such as "rogue" zones and a plant setpoint on a limit. The tool involves a start/stop button.

Figure 8:
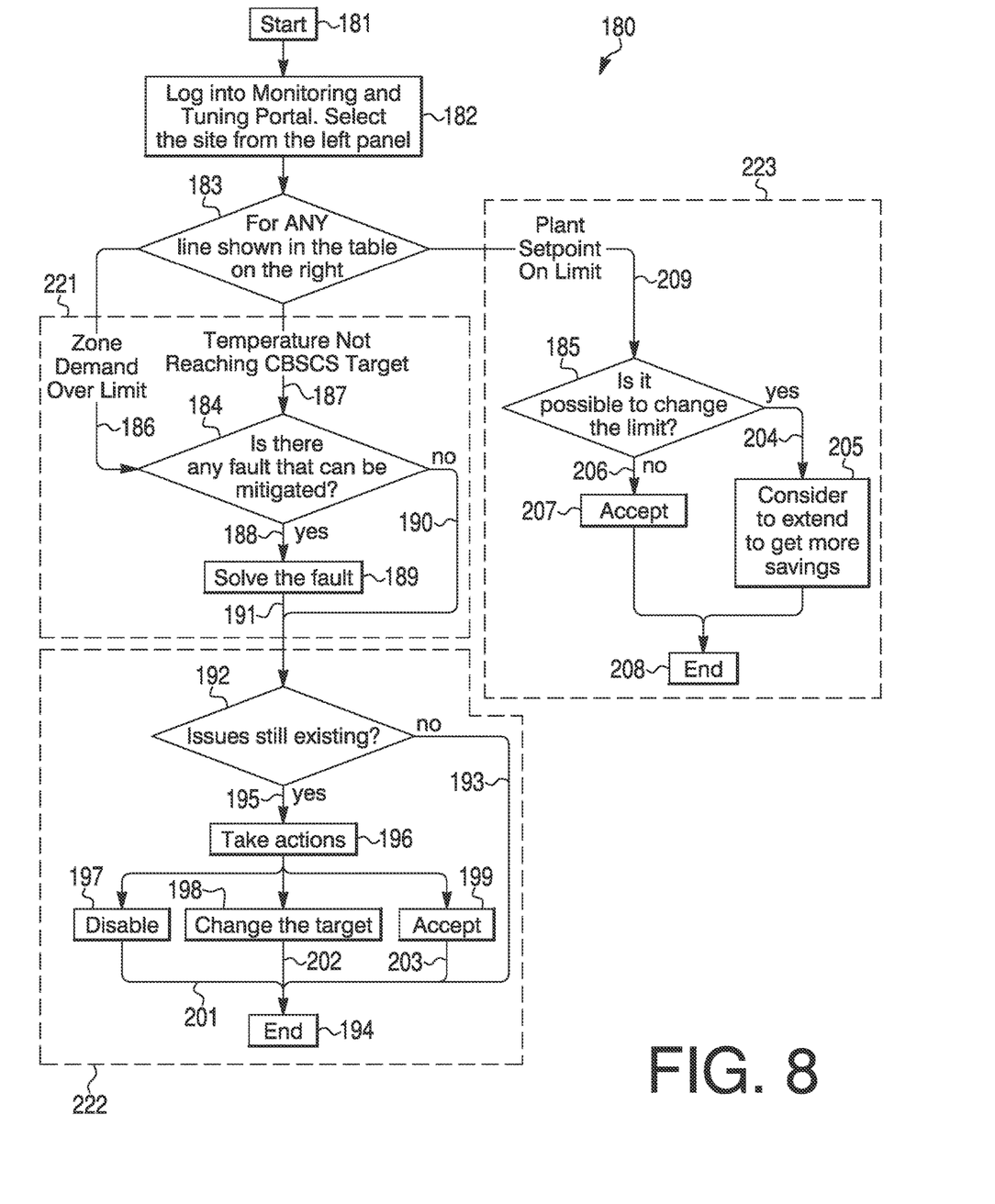
FIG. 8 is a diagram illustrating a savings blockers mitigation workflow.

FIG. 8 is a diagram 180 illustrating a savings blockers mitigation workflow. A start commences at symbol 181 and goes to a symbol 182 indicating a log into a monitoring and tuning portal. A site is selected from the left panel. A question at symbol 183 with an input from symbol 182 has three outputs or paths to symbols 184 and 185. Symbol 183 indicates outputs in response to a statement that concerns any line shown in the table 175 on the right of diagram 180. An output 186 indicating a zone demand over limit goes to a symbol 184 that asks a question of whether there is any fault that can be mitigated. A second output 187 from symbol 183 to symbol 184 indicates a temperature not reaching a CBSCS target.

If an answer to the question at symbol 184 is yes, then the fault is solved at symbol 189 at an output 188 to symbol 189. If the answer to the question at symbol 184 is no, on the line 190, then line 190 with the no response joins a line 191 from an output of symbol 189. The outputs of lines 190 and 191 go to a symbol 192 which asks a question whether any issues are still existing. If an answer is no on line 193, then the answer goes to an end symbol 194. If the answer to the question at symbol 192 is yes on line 195, then actions are taken at symbol 196. The actions incorporate a disable at symbol 197, change the target at symbol 198, and accept it at 199. One or more of these actions are taken, if any. Other actions not listed here can also be taken. Outputs 201, 202 and 203 from symbols 197, 198 and 199, respectively, go to an end at symbol 194.

Returning to outputs from symbol 183, there is an output 209 indicting a plant setpoint on limit. Output 209 goes to symbol 185 that asks a question of whether it is possible to change the limit. If an answer is yes on line 204 that goes to a symbol 205, then symbol 205 may consider extending the limit to get more savings. After an action by symbol 205 is considered or taken, then the approach may end at symbol 208. If an answer from symbol 185 is no on a line 206, then the limit is accepted at symbol 207. An output of symbol 207 indicates an end of the approach at symbol 208.

A sub-diagram 221 of diagram 180 deals with faults of rogue zones. As for background, there are two comfort monitoring mechanisms. One mechanism is for demand and the other mechanism is for temperature. By default, demand monitoring is used because in many cases the demand signal is between 0 and 100, so it is easy to set a default limit value. However, if a zone is rogue, it has a 100 percent demand continuously. One can ignore a demand exceeding the limit value and set a temperature limit for such zone. A question asked is whether situation could be mitigated by solving the fault. Situations noted include a too low or too high zone temperature setpoint, and wrongly designed equipment such as that having a too high load. Other situations include a terminal equipment fault, a wrongly placed sensor, and a human action such as, for example, an opened window.

A sub-diagram 222 of diagram 180 deals with situations where the zone was checked for faults. It can be disabled 197 when comfort in the zone is not important for a customer (e.g., a storeroom, or when it is not possible to reach a set-point in the zone (e.g., a loading bay open to an ambient environment). A consequence is that the zone will not be considered for comfort monitoring. Such action might be done after consultation with the customer.

Dealing with a zone having an issue can involve changing a CBSCS target 198 or accepting the zone as savings blocker 199.

With sub-diagram 223 of diagram 180, setpoint limits are be extended for plants. For example, a chiller plant supply water temperature at a limit of 15 degrees C. and the zone demands are satisfied. A higher supply water temperature (increasing the maximum limit) brings more savings. This situation might be discussed in consultation with a customer.

Figure 9:
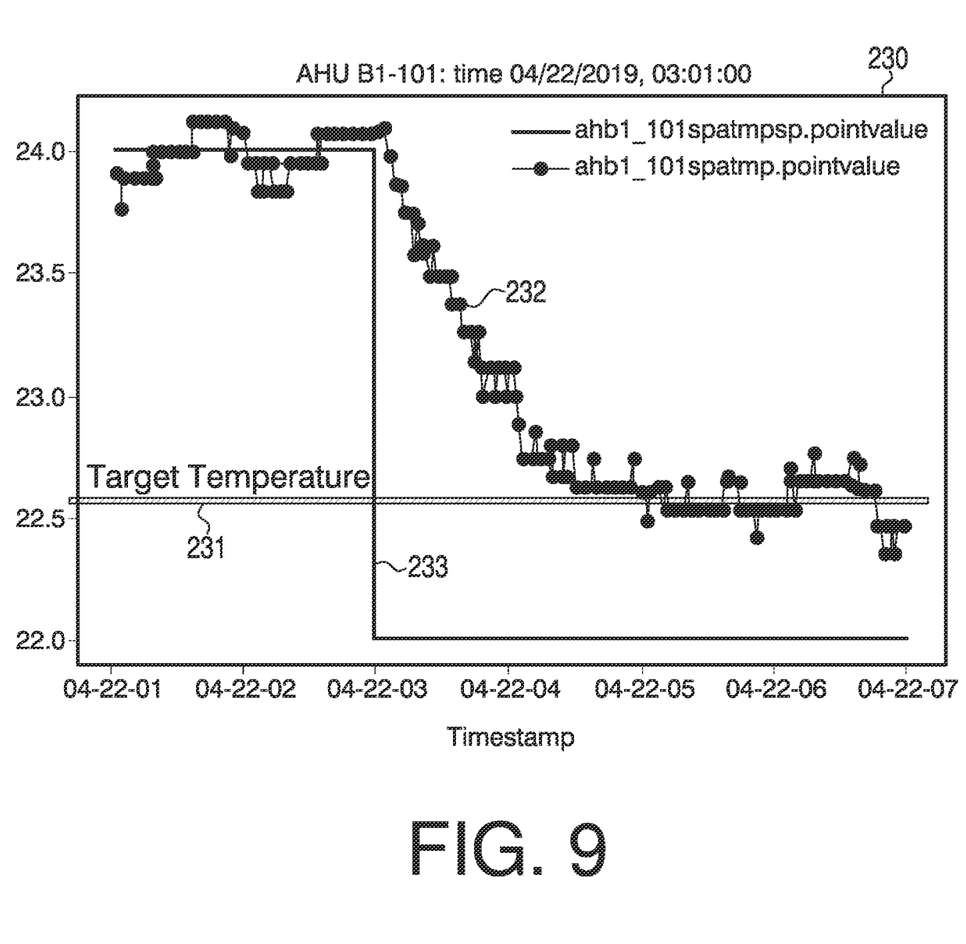
FIG. 9 is a diagram showing a temperature target that represents an internally used and achievable setpoint for an example air handling unit.

If the demand is 100 percent continuously, the setpoint is not necessarily met. A temperature target 231 in diagram 230 of FIG. 9, represents an internally used and achievable setpoint for an air handling unit (AHU). An approach involves one out of (demand, temperature) used for comfort monitoring. Mechanisms should be set for each zone at a given time, so when temperature target 231 is changed from a default value (e.g., 1000), the demand limit should be set to some high value (i.e., 1000). Diagram 230 shows temperature magnitude 232 versus time for a zone of, for instance, an AHU B1-101. A temperature set-point 233 is shown. As temperature 232 falls according to the set-point 233, the target temperature 231 limits the amount of fall of temperature 232.

If a zone is critical and its target temperature 231 cannot be adjusted (e.g., visitors queueing in the zone), one needs to simply accept it as savings blocker. However, this situation has to be communicated to a customer of the zone, since it has an impact on energy savings. A notification mechanism 16 provides a notification via a given channel that occurs when a significant change to the system happens, particularly one that affects an optimization of the system. One or more significant changes may incorporate a connectivity loss, an invoked comfort protection mechanism, unsuccessful optimization, a manual override of a CBSCS operation, a manual switch between the CBSCS and an original strategy, and an exception in an SW operation. The given channel is a ticketing system, email or phone, and so on.

Any publication or patent document noted herein may hereby be incorporated by reference to the same extent as if each individual publication or patent document was specifically and individually indicated to be incorporated by reference.

In the present specification, some of the matter may be of a hypothetical or prophetic nature although stated in another manner or tense.

Although the present system and/or approach has been described with respect to at least one illustrative example, many variations and modifications will become apparent to those skilled in the art upon reading the specification. It is therefore the intention that the appended claims be interpreted as broadly as possible in view of the related art to include all such variations and modifications.

What is claimed is:
1. A building supervisory control structure comprising:
   a supervisor controller connectable to a cloud, wherein the supervisor controller comprises a processor communicatively coupled to the cloud, and wherein the processor is configured to manage communication and control tasks between the cloud and one or more systems associated with a building;

a heating, ventilation and air conditioning (HVAC) unit connected to the supervisor controller and the cloud; and
a safety features stack connected to the supervisor controller; and
wherein:
the HVAC unit provides comfort temperature control for a building; and
the safety features stack comprises a connectivity check automated fail-over, an optimization watchdog incorporating constraints of adjustable comfort limits for each room or zone, adjustable bounds and maximum allowed steps of setpoints to prevent sudden changes of action variables, a rule-based comfort protection mechanism that provides automatic adjustment of one or more setpoints when comfort limits are exceeded, wherein the adjustment is made based on one or more predefined rules incorporating zone-specific conditions, savings bottlenecks overview comprising a table listing zones where comfort limits are exceeded, the savings bottlenecks overview suggests parameters for constraints of maximum or minimum zone temperature and cooling or heating demand, wherein the suggestion for the parameters is based on a situation of a zone in the building, and wherein the suggestion comprises extension of one or more setpoint limits for an asset in the zone based on a demand for the zone, ordering the zones according to a percentages of time that the comport limits were exceeded, showing their comfort targets, and whether they are enabled or disabled for comfort monitoring, a human override, and a notification mechanism.

2. The structure of claim 1, wherein the connectivity check automatic-fail-over mechanism comprises:
a control strategy switching logic; and
connectivity watchdog.

3. The structure of claim 2, wherein the supervisor controller is configured to:
check if the connectivity, is functional using a timer with a selector mechanism; and
based on the functional connectivity, produce one or more governing signals to switch one or more set points between an original value and a supervisor value, and wherein the one or more governing signals are provided to a controller of a heating, ventilation and air conditioning (HVAC) unit.

4. The structure of claim 1, wherein:
the comfort protection mechanism has at least one pair of items, the items including a setpoint with setpoint parameters and a state variable with thresholds;
for each pair of items, a condition is defined to trigger the comfort protection mechanism when the state variable is above or below the threshold; and
for each pair of items, an adjustment is defined to do nothing, to increase or decrease the setpoint according to its parameters.

5. The structure of claim 4, wherein for each pair of items, their conditions and adjustments are presented in one or more tables.

6. The structure of claim 1, wherein the savings bottlenecks overview further comprises:
a selector of a time period for analysis of the zones and plants; and
an actual status of the supervisor controller with a start/stop button.

7. The structure of claim 6, wherein the savings bottlenecks overview further has:

a table listing of plants where a setpoint was at the setpoint limit;
a time series plot for one or more zones selected in the zones table, showing their temperature, setpoint, comfort target, and occupancy; and
a time series plot for one or more plants selected in the plants table, showing their setpoint, its limits, and plant enable signals.

8. The structure of claim 1, wherein the supervisor controller is further configured to:
eliminate issues with a potential loss of cloud-building connectivity;
eliminate a potential loss of comfort in case a machine model is suboptimal or incorrect; and
resolve automatically an unexpected on-site situation which has a potential to cause or increase discomfort.

9. The structure of claim 8, wherein:
the savings bottlenecks overview, is implemented as a part of a comfort setting and protection subsystem with a user interface enabling detection and mitigation of savings constraints and bottlenecks;
the human override enables a full customer or resident or operator control to revert back to original strategy when desired by a customer or resident or operator; and
the structure is configured to keep all parties informed so that they can act within a predetermined period of time.

10. A building supervisory control system comprising:
a heating, ventilation and air conditioning (HVAC) unit for temperature control of a building; and
a supervisor controller connected to the HVAC unit; and
wherein;
the HVAC unit comprises a one or more items of a group comprising a heating source, a cooling source, ducts, sensors and actuators situated for the building;
the supervisor controller comprises a safety measures stack, wherein the safety measures stack comprises an optimization watchdog incorporating constraints of adjustable comfort limits for each room or zone, adjustable bounds and maximum allowed steps of setpoints to prevent sudden changes of action variables, a comfort protection mechanism that provides automatic adjustment of one or more setpoints when comfort limits are exceeded, wherein the adjustment is made based on one or more predefined rules incorporating zone-specific conditions, notification user interfaces, and a savings bottlenecks overview comprising a table listing zones where comfort limits were exceeded, the savings bottlenecks overview suggests parameters for constraints of maximum or minimum zone temperature and cooling or heating demand wherein the suggestion for the parameters is based on a situation of a zone in the building, and wherein the suggestion comprises extension of one or more setpoint limits for an asset in the zone based on a demand for the zone, ordering the zones according to a percentages of time that the comfort limits were exceeded, showing their comfort targets, and whether they are enabled or disabled for comfort monitoring; and
the supervisor controller and the HVAC are cloud-based.

11. The control system of claim 10, wherein the safety features stack further comprises a connectivity check automatic fail-over and a human override.

12. The control system of claim 11, wherein the control system is configured to:
indicate a warning upon a difference of an energy optimization with an on-site setpoint, and with a connection loss, and switchback to an original strategy within a predetermined period of time, and wherein the connectivity check automatic fail-over comprises a timer and a selector to perform regular connectivity checks and switch back to the original strategy in response to the connection loss within the predefined time;

or manually switch back to the original strategy in any moment.

13. The control system of claim 10, wherein the control system comprising the savings bottlenecks overview and the notification mechanism is configured to:
   automate switchback to an original strategy if optimization fails during a predetermined period of time;
   provide 24-hour/7-day comfort monitoring and wherein in the event that a model is incorrect and a certain predetermined comfort limit is exceeded, the control system automatically invokes a rule-based control with adjustable setpoint steps;
   identify rogue zones and enable checking of rogue zones, and enable or disable them for optimization; and
   inform an operator about a change of a system that affects an optimization.

14. A building management system comprising:
   a supervisor controller connected to a cloud, wherein the supervisor controller comprises a processor communicatively coupled to the cloud, and wherein the processor is configured to manage communication and control tasks between the cloud and one or more systems associated with a building;
   a heating, ventilation and air conditioning (HVAC) system connected to the supervisor controller and the cloud; and
   a safety features stack connected to the supervisor controller; and
   wherein:
   the HVAC system is for comfort control of occupants in rooms and zones of a building;
   the safety features stack is connected to the HVAC;
   the safety features stack comprises a connectivity check automatic fail-over, an optimization watchdog incorporating constraints of adjustable comfort limits for each room or zone, adjustable bounds and maximum allowed steps of setpoints to prevent sudden changes of action variables, a rule-based comfort protection mechanism that provides automatic adjustment of one or more setpoints when comfort limits are exceeded, wherein the adjustment is made based on one or more predefined rules incorporating zone-specific conditions, savings bottlenecks overview comprising a table listing
   zones where comfort limits were exceeded, ordering the zones according to a percentages of time that the comfort limits were exceeded, the savings bottlenecks overview suggests parameters for constraints of maximum or minimum zone temperature and cooling or heating demand, wherein the suggestion for the parameters is based on a situation of a zone in the building, and wherein the suggestion comprises extension of one or more setpoint limits for an asset in the zone based on a demand for the zone, showing their comfort targets, and whether they are enabled or disabled for comfort monitoring a human override, and a notification mechanism; and
   the one or more safety features are categorized according to a solution subsystem and an implementation scope.

15. The management system of claim 14, further comprises:
   implementation scopes of a cloud and a building; and
   solution subsystems of a core pipeline, comfort settings and protection, and a human interaction.

* * * * *